(12) United States Patent
Galle

(10) Patent No.: US 9,183,193 B2
(45) Date of Patent: Nov. 10, 2015

(54) BAG-OF-REPEATS REPRESENTATION OF DOCUMENTS

(71) Applicant: Xerox Corporation, Norwalk, CT (US)

(72) Inventor: Matthias Galle, St-Martin d'Heres (FR)

(73) Assignee: XEROX CORPORATION, Norwalk, CT (US)

( * ) Notice: Subject to any disclaimer, the term of this patent is extended or adjusted under 35 U.S.C. 154(b) by 278 days.

(21) Appl. No.: 13/765,066

(22) Filed: Feb. 12, 2013

(65) Prior Publication Data

US 2014/0229160 A1  Aug. 14, 2014

(51) Int. Cl.
*G06F 17/27* (2006.01)
*G06F 17/28* (2006.01)

(52) U.S. Cl.
CPC ..................... *G06F 17/27* (2013.01)

(58) Field of Classification Search
CPC ........................................ G06F 17/27
See application file for complete search history.

(56) References Cited

U.S. PATENT DOCUMENTS

| | | | |
|---|---|---|---|
| 7,058,567 | B2 | 6/2006 | Ait-Mokhtar et al. |
| 7,877,258 | B1* | 1/2011 | Chelba et al. ................. 704/257 |
| 2007/0061356 | A1* | 3/2007 | Zhang et al. .................. 707/102 |
| 2007/0239745 | A1 | 10/2007 | Guerraz et al. |
| 2011/0040711 | A1 | 2/2011 | Perronnin et al. |
| 2011/0103682 | A1 | 5/2011 | Chidlovskii et al. |

OTHER PUBLICATIONS

Ait-Mokhtar, et al. "Robustness beyond shallowness: incremental dependency parsing" Natural Language Engineering 8 (2/3), pp. 121-144, 2002.
Brun, et al. "Normalization and paraphrasing using symbolic methods", ACL: Second Int'l Workshop on Paraphrasing, Paraphrase Acquisition and Applications, pp. 1-8, 2003.
Puglisi, et al. "Fast optimal algorithms for computing all the repeats in a string", Prague Stringology Conference, pp. 161-169, 2008.
Gusfield, D. "Algorithms on Strings, Trees and Sequences: Computer Science and Computational Biology" Cambridge University Press, pp. 41-60, Jan. 1997.
Blei "Probabilistic Topic Models" Communications of the ACM, 55(4), pp. 77-84, Apr. 2012.
Manning, Christopher D. et al., "Introduction to Information Retrieval", slides, pp. 1-11, 2008.
Nicolas, et al. "Modeling local repeats on geometric sequences" Technical Report, INRIA, pp. 1-43, 2008.
U.S. Appl. No. 13/437,079, filed Apr. 4, 2012, Galle, et al.
Wolff, J. "Learning syntax and meanings through optimization and distributional analysis" Categories and processes in language acquisition, pp. 179-215, Jan. 1998.

(Continued)

*Primary Examiner* — Benny Q Tieu
*Assistant Examiner* — Sunil Chacko
(74) *Attorney, Agent, or Firm* — Fay Sharpe LLP

(57) ABSTRACT

A system and method for representing a textual document based on the occurrence of repeats are disclosed. The system includes a sequence generator which defines a sequence representing words forming a collection of documents. A repeat calculator identifies a set of repeats within the sequence, the set of repeats comprising subsequences of the sequence which each occur more than once. A representation generator generates a representation for at least one document in the collection of documents based on occurrence, in the document, of repeats from the set of repeats.

24 Claims, 6 Drawing Sheets

(56) References Cited

OTHER PUBLICATIONS

Nevill-Manning, et al. "Compression and explanation using hierarchical grammars" The Computer Journal, 40(2,3):103-116, Feb. 1997.

Solan, et al. "Unsupervised learning of natural languages" Proceedings of the National Academy of Sciences, vol. 102, No. 33, pp. 11629-11634, Aug. 2005.

Van Zaanen, Menno "ABL: Alignment-based learning" 18th Intl. Conf. on Computer Linguistics, pp. 961-967, 2000.

Clark, Alexander "Learning deterministic context free grammars: The omphalos competition" Machine Learning, 66(1) pp. 930-110, Jan. 2007.

Apostolico, et al. "Efficient tools for comparative substring analysis" Journal of Biotechnology, 149(3): 120-126, Sep. 2010.

Rousseau, et al. "CRISPI : a CRISPR interactive database" Bioinformatics, 25(24), pp. 3317-3318, 2009.

Wallach "Topic Modeling: Beyond Bag-of-Words" ICML, No. 1, pp. 977-984, 2006.

Wang, et al. "Topical N-Grams: Phrase and Topic Discovery, with an Application to Information Retrieval" 7th IEEE Intl. Conf. on Data Mining, pp. 697-702, 2007.

Blei, et al. "Modeling annotated data" Proc. 26th Annual Intl. ACM SIGIR Conf. on Research and Development in Information Retrieval, pp. 127-134, 2003.

\* cited by examiner

| WEST GERMANY | MARKET | SOVIET | BUSH |
| EAST GERMANY | DOLLAR | SOVIETS | CONGRESS |
| WEST GERMAN | POINTS | SOVIET UNION | BUDGET |
| EAST GERMAN | YEN | UNITED STATES | PRESIDENT |
| GERMAN | STOCK MARKET | REAGAN | PRESIDENT BUSH |
| BRITAIN | STOCKS | MOSCOW | ADMINISTRATION |
| MRS. THATCHER | INVESTORS | SUMMIT | DEFICIT |
| BERLIN | MILLION SHARES | TALKS | BUSH ADMINISTRATION |
| EAST GERMANS | TRADING | BAKER | NATION |
| KOHL | TRADERS | TREATY | AMERICA |
| SWEDEN | ANALYSTS | PRESIDENT REAGAN | SPENDING |
| WEST BERLIN | FELL | COUNTRIES | PACKAGE |
| GERMANY | ROSE | NEGOTIATIONS | CUTS |
| UNITED GERMANY | FRENCH FRANCS | TRIP | BILLION |
| KEPHART | STOCK PRICES | NATIONS | PROPOSAL |
| UNIFICATION | ITALIAN LIRE | PRESIDENT BUSH | PROGRAMS |
| BRITISH | NEWS | STATE DEPARTMENT | TAX |
| NORWAY | DEALERS | MILITARY | SOCIAL SECURITY |
| EC | TODAY | MISSILES | CUT |
| ALLIES | WALL STREET | LEADERS | DEFENSE |

FIG. 6

BAG-OF-REPEATS REPRESENTATION OF DOCUMENTS

BACKGROUND

The exemplary embodiment relates to systems and methods for representing a textual document using identified repeats, which facilitates interpretation of documents such as classifying the textual document, and comparing or clustering of documents.

In order to perform mathematical operations on a document, the first step is to define a mapping that represents the document as a data structure. For example, sequences are standard representations for documents in the bioinformatics field. However, the high dimensionality and lack of flexibility inherent in sequence representations make them unpopular for natural language applications. Accordingly, the most popular representation for documents in natural language applications is the vector space model. In the vector space model, a document d is mapped into a vector $v(d) \in \mathcal{R}^D$. Normally, such a mapping proceeds by extracting a defined set of features from d, which are subsequently weighted through a scoring scheme.

The standard approach for extracting features and creating representations for textual documents is called the "bag-of-words," where each dimension in the vector space model represents one word. However, this standard approach of just counting words, or unigrams, has some well-known shortcomings. For instance, it is a lossy representation and as such can map different documents into the same representation. While less problematic in query systems, the bag-of-words approach becomes an issue when comparing full-length documents. Another drawback of counting single words is that multi-words expressions (collocations) are missed. Thus, a document where "New York" occurs may not be recognized as different from one which contains separate occurrences of the words "New" and "York."

One way of addressing the issues with the bag-of-words and unigrams is by using a higher level language model such as n-grams. However, the n-gram approach introduces other issues, e.g., the dimension of the vocabularies increases exponentially with n, which decreases computational efficiency. Additionally, the vector representation becomes much sparser, which makes it difficult to compute similarities. In general, n-gram models with $n \geq 3$ become so problematic that performance decreases considerably.

There remains need for a more principled way of using n-grams in document representations, without the limitation of a fixed size and the derived shortcoming of missing shorter or longer terms.

INCORPORATION BY REFERENCE

The following references, the disclosures of which are incorporated herein in their entireties, by reference, are mentioned:

The following relate to training a classifier and classification: U.S. Pub. No. 20110040711, entitled TRAINING A CLASSIFIER BY DIMENSION-WISE EMBEDDING OF TRAINING DATA, by Perronnin, et al.; and U.S. Pub. No. 20110103682, entitled MULTI-MODALITY CLASSIFICATION FOR ONE-CLASS CLASSIFICATION IN SOCIAL NETWORKS, by Chidlovskii, et al.

The following relates to the bag-of-words format: U.S. Pub. No. 20070239745, entitled HIERARCHICAL CLUSTERING WITH REAL-TIME UPDATING, by Guerraz, et al.

BRIEF DESCRIPTION

In accordance with one aspect of the exemplary embodiment, a system for representing a textual document based on the occurrence of repeats, includes a sequence generator which defines a sequence representing words forming a collection of documents. A repeat calculator identifies a set of repeats within the sequence, the set of repeats comprising subsequences of the sequence which each occur more than once. A representation generator generates a representation for at least one document in the collection of documents based on occurrence, in the document, of repeats from the set of repeats. A processor implements the sequence generator, repeat calculator, and representation generator.

In another aspect, a method for representing a textual document based on the occurrence of repeats includes receiving a collection of text documents and defining a sequence representing words forming the collection of documents. A set of repeats is identified within the sequence, the set of repeats including subsequences of the sequence which each occur more than once. A representation is generated for at least one document in the collection of documents based on occurrence, in the document, of repeats from the set of repeats. At least one of the defining a sequence, identifying a set of repeats, and generating a representation may be performed by a computer processor.

In another aspect, a method for representing a textual document based on the occurrence of repeats includes receiving a collection of documents, defining a sequence representing words forming the collection of documents and identifying a set of repeats within the sequence, the set of repeats comprising all subsequences of the sequence which each occur more than once. From the set of repeats a subset of the repeats that are at least one of both left and right context diverse or both left and right context unique in the sequence is identified. A vectorial representation for at least one document in the collection of documents is generated, based on occurrence, in the respective document, of repeats identified as being in the subset of repeats. At least one of the defining a sequence, identifying a set of repeats, identifying a subset of the repeats, and generating a representation may be performed by a computer processor.

BRIEF DESCRIPTION OF THE DRAWINGS

FIG. 6 is table of most probable words for a selection of topics learned on a standard Latent Dirichlet Allocation (LDA) model inferred with 50 topics.

DETAILED DESCRIPTION

Figure 1:
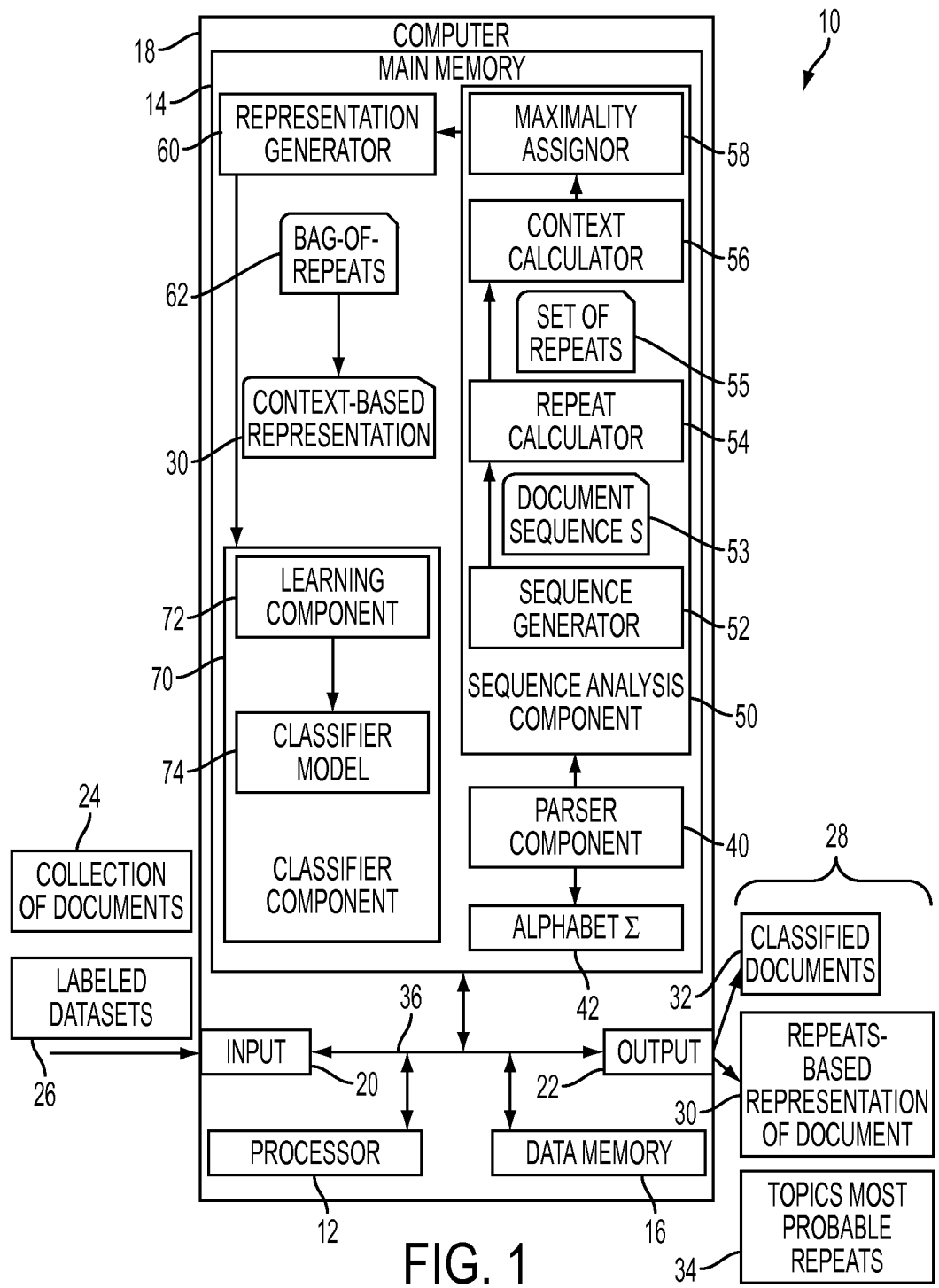
FIG. 1 is a functional block diagram of a system for representing a textual document with a document representation which is based on the occurrence of repeats and for processing the document based on the document representation.

Aspects of the exemplary embodiment relate to representing a document based on the occurrence of repeats. The repeats may be identified as repeated subsequences within a sequence representing a collection of documents.

A "repeat" or "repeat subsequence" as used herein is a subsequence of symbols (each symbol representing or being a word), the subsequence comprising at least one symbol and wherein at least two occurrences of the subsequence are present in a sequence of symbols. The sequence of symbols may represent the all the words present in a collection of documents, arranged in conventional reading order, the document collection including at least two documents, and generally being a much larger collection. The documents considered herein are textual documents in a natural language, such as English or French, having a grammar. The words represented in the sequence are thus words which are primarily found in a dictionary of one or more languages, or which are proper nouns or named entities which obey the grammar of the language. A repeat need not be limited to a single document and in general at least some of the repeats have subsequence occurrences in more than one of the documents in the collection. In general, repeats do not overlap, but there are cases where one repeat may partially overlap another. For example if the sequence in the document is represented by the symbols ABCCCCC, then repeats CCCC and CCCC can be found, or in a sequence ACACAC, repeats of ACA and ACAC would overlap.

The exemplary system and method provide a solution for overcoming the disadvantages present in the unigram and n-gram approach towards representing textual documents by combining unigrams (single words) and n-grams (where n is greater than 1), as in bigrams. This combination is achieved by representing textual documents with a vector space model indexed by repeats rather than specific to unigrams, bigrams, or higher n-grams. This method of representing documents by repeats is referred to as the "bag-of-repeats" method. The bag-of-repeats method has advantages in that it uses n-grams as basic features, e.g., providing a higher context for each repeated term, while at the same time, avoiding the problem of fixing the size of the n-gram. The length of each repeat is determined by the length of the subsequence which is repeated. A repeat can thus be two, three, four, five, or more words in length and in theory, up to half the length of the sequence of words (or longer, where there is a string of identical symbols), although in practice, each repeat is generally no longer than a sentence or paragraph.

The conventional n-gram language models fails to capture a multi-word expression of size n+1, but under the bag-of-repeats method, the multi-word expression may be appear as a repeat assuming that it appears more than once in the document collection. Therefore, the bag-of-repeats method can provide a more principled way of using n-grams in document representations, without the limitation of a fixed size and shortcoming of missing shorter or longer terms.

The bag-of-repeats method can be performed by defining subset of repeat occurrences within a sequence representing all words in a collection of documents. Once the occurrence (frequency) of these repeats is calculated, a maximality class of repeats may be defined for a document, as described below. In this way, a quadratic explosion of the repeats may be avoided. The maximality class of repeats may be used to train a classifier. The trained classifier can be subsequently used to predict the label for a document within a collection of unlabeled documents.

FIG. 1 illustrates an environment in which an exemplary computer-implemented system 10 for representing a textual document and classifying the document based on the occurrence of repeats operates. In the system, the bag-of-repeats method is applied to textual documents. The system 10 includes a computer 18 with main memory 14 and data memory 16. The memory 14 stores instructions for performing the exemplary method described in FIG. 2. A processor 12 is in communication with the memory 14. The digital processor 12, in addition to controlling the operation of the computer 18, executes the instructions stored in memory 14.

The digital processor 12 can be variously embodied, such as a single-core processor, a dual-core processor (or more generally by a multiple-core-processor), a digital processor and cooperating math coprocessor, a digital controller, and the like. The computer 18 may include one or more dedicated or general purpose computing devices, such a server computer or a desktop or laptop computer with an associated display device and a user input device, such as a keyboard and/or cursor control device (not shown), or any suitable computing device capable of implementing the method.

The memories 14, 16 may be separate or combined and may represent any type of computer readable memory such as random access memory (RAM), read only memory (ROM), magnetic disk or tape, optical flash, flash memory, or holographic memory. In one embodiment, the memory 14, 16 comprises a combination of random access memory and read only memory.

The term "software" as used herein is intended to encompass any collection or set of instructions executable by a computer or other digital system so as to configure the computer or other digital system to perform the task that is the intent of the software. The term "software" as used herein is intended to encompass such instructions stored in the storage medium such as RAM, a hard disk, optical disk, or so forth, as is also intend to encompass so-called "firmware" that is software stored on a ROM or so forth. Such software may be organized in various ways, and may include software components organized as libraries, Internet-based programs stored on a remote server or so forth, source code, interpretive code, directly executable code, and so forth. It is contemplated that the software may invoke system-level code or calls to other software residing on a server or other location to perform certain functions.

The illustrated computer 18 includes an input module 20 that may receive a collection of text documents 24, such as newspaper articles, OCRed forms, and the like. The input module may also receive a dataset 26 of labeled documents for classification training purposes. The dataset 26 of labeled documents may be a part of the collection 24. Output interface 22 outputs information 28 generated by the system, such as one or more of a document representation 30 for one or more documents in the collection, classified documents 32 and most probable repeats 34.

Exemplary input and output interfaces include wired and wireless network interfaces, such as modems, or local interfaces, such as USB ports, disk drives, and the like. Components 12, 14, 16, 20, and 22 of the computer are communicatively interconnected by a data/control bus 36.

In one embodiment, the computer 18 is configured by suitable programming or hardwired firmware to embody a parser component 40, a sequence analysis component 50, a vector space representation generator 60, and optionally a document processing component 70 which employs the document representation for generation of information 28. In the illustrated embodiment, the document processing component is shown as a classifier component, however, it is appreciated that the document representation generated by the exemplary system may be used in other processes such as clustering documents, for example, to identify topics, or for computing a similarity (or divergence) between documents, for example, for document retrieval.

The parser component 40 may pre-process the input collection of documents 24 by employing a grammar or other processing technique. The parser unit 40 may reduce all the words in the collection of documents to a normalized form, such as a lemmatized, lowercase form. For example, plural nouns are replaced by the singular form and verbs by the infinitive form.

The parser unit 40 may, before or after pre-processing, generate an alphabet or dictionary 42 which includes all the optionally normalized words found within the collection of documents 24.

The sequence analysis component 50 may include a sequence generator 52 which defines a document collection sequence 53 of symbols representing all of the normalized words in the collection of documents 24 in the order in which they appear. Each word in the sequence 53 may also be found in the alphabet or dictionary created by the parser unit 40.

The sequence analysis unit 50 may further include a repeat calculator 54 for identifying all of repeat subsequences (repeats) of symbols which occur in the sequence 53, the repeats being identified regardless of sequence length, and for computing the number of occurrences of a repeat subsequence within the sequence 53 in the collection of documents 24 as a whole, and within individual documents in the collection. The set of all repeats and associated context information for occurrences of the repeats, may be stored in memory.

A context calculator 56 may analyze the set 55 of repeat subsequences identified by the repeat calculator 54 to determine whether they are left and/or right context diverse and/or left and/or right context unique, and assign a context to at least some of the repeats based on the determination.

A maximality assignor 58 may use the context information from the context calculator 56 to identify whether a repeat subsequence is a maximal repeat, a largest-maximal repeat, or other class of repeat, based on the context information, and to assign a maximality class to at least some of the repeat subsequences.

The representation generator 60 generates a vector space representation 30 of a document within the collection of documents 24 based on the identified repeats in the particular document. Each document may thus be given its own respective representation which is based on the subsequences occurring only in the portion of the sequence which forms that particular document. The representation generator 60 may generate, for each document in the collection, a bag-of-repeats representation 62, which includes a value for each repeat subsequence in the set of repeats, the value being based on the occurrences of the repeat in the document (e.g., based on the number of occurrences or simply the presence/absence of an occurrence). In another embodiment, the representation 30 includes features which are based on the assigned context and/or maximality class of the repeats, where the value for each index in the representation is based on the occurrences of one of those repeats that are in the document which are classed as maximal or largest-maximal (e.g., based on the number of occurrences or simply the presence/absence of an occurrence). In one embodiment, repeats of a particular maximality class, determined by the maximality assignor 56, are used as a feature of the representation 30. Combinations of these features may be employed.

The classifier component 70 predicts the class of a document, based on its document representation 30 generated by the generator 60. The classifier component 70 may include a learning component 72 for learning a classifier model 74 for classifying documents, e.g., by assigning labels to the documents from a predefined set of labels. The learning is performed using the input pre-labeled dataset 26 of documents for which vector space representations are generated in a similar manner. Once trained, the classifier model is configured for classifying unlabeled documents in the collection based on their document representations. As will be appreciated, classifier component may be replaced with another document processing component, such as a clustering component, comparison (e.g., similarity or divergence) computing component, document retrieval component, or the like.

Figure 2:
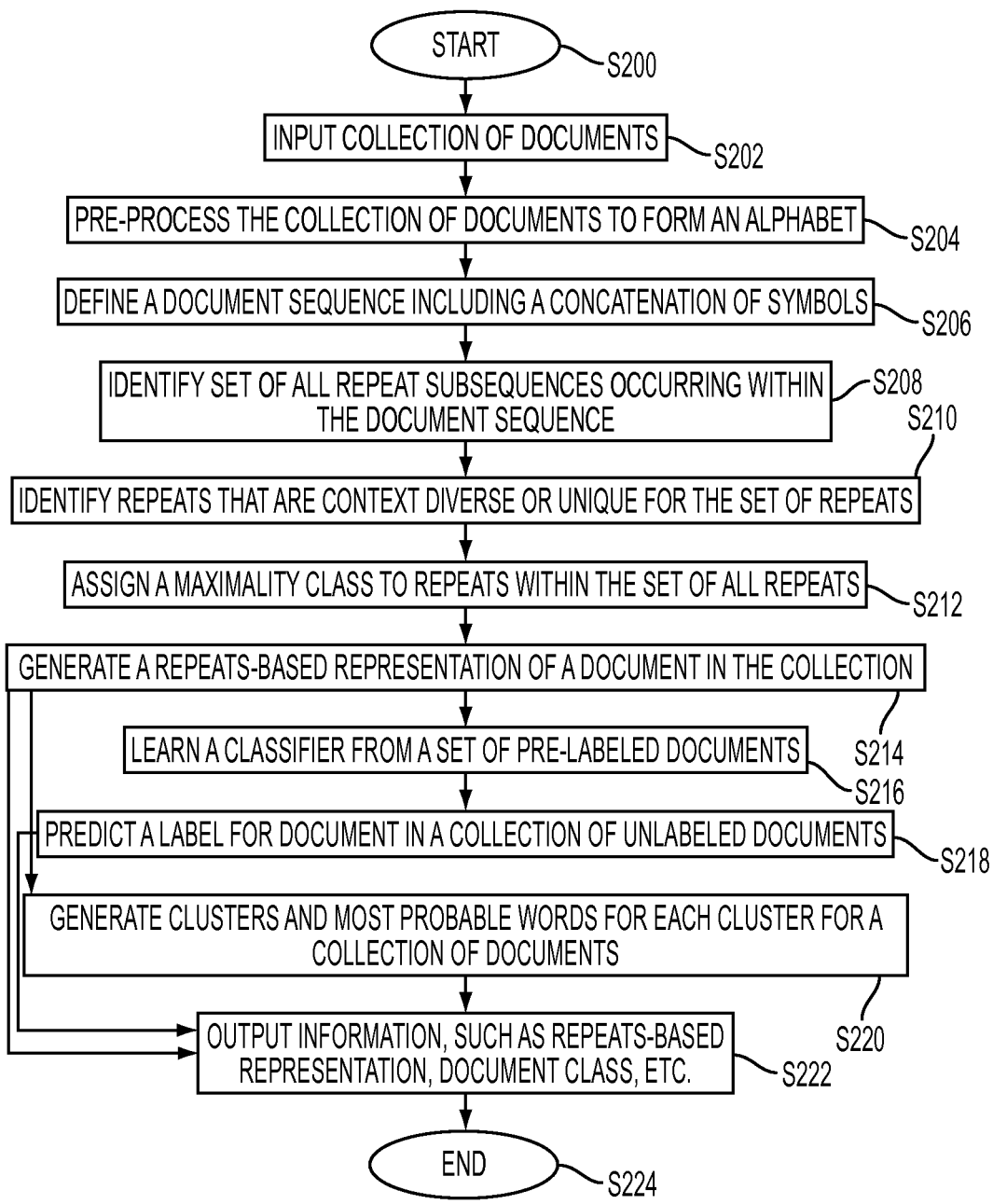
FIG. 2 is a flow chart illustrating a method for representing a textual document with a document representation which is based on the occurrence of repeats and for processing the document based on the document representation.

With reference to FIG. 2, a computer implemented method which may be performed with the system of FIG. 1 is shown. The method, details of which are described in greater detail below, begins at S200.

At S202, a collection of textual documents 24 is input and may be stored in computer memory 16 for subsequent processing.

At S204, the collection of textual documents 24 may be pre-processed by the parser component 40 to identify words and to normalize the words by place the text in lowercase, lemmatized form. Individual words from the collection of pre-processed documents may each be represented as unique symbols in an alphabet set $\Sigma$ (e.g., each normalized word is indexed by a unique number or the alphabet is simply indexed as the normalized words themselves). The alphabet in this case thus constitutes a vocabulary of words, and optionally other tokens, such as punctuation and numerical sequences, which occur in the collection of documents as a whole.

At S206, a document sequence 53 may be defined which can be represented by a concatenation of symbols representing the words in the collection of documents 24.

At S208, repeat sequences are identified in the documents. A repeat subsequence is defined as one which occurs within the document sequence 53 at least twice. A set of repeats 55 is identified which includes the occurrences of all (or at least some) of subsequences r within sequence s.

At S210, the context of repeats within the set of repeats 55 may be analyzed and the repeats labeled as being either left and/or right context diverse or context unique, with respect to the document collection.

At S212, a maximality class may be assigned to the set of repeats, based on the identification of context diverse repeats.

At S214, a repeats-based vector space representation of a document is generated which includes a feature based on the identified repeats in the document.

At S216, in one embodiment, a classifier may be learned from a set of labeled documents, each represented by a respective repeats-based vector space representation.

At S218, a label may be predicted for a document in a collection of unlabeled documents using the trained classifier. The unlabeled documents are each represented by a respective repeats-based vector space model.

At S220, in one embodiment, documents are clustered based on the repeats-based representations of the documents in a collection of documents 24. For each cluster, the most probable repeats may be identified. These demonstrate the expressiveness of the exemplary keywords generated by the method.

At S222, information 28, such as the repeats-based vectorial representation 30, document class, or other information based on the repeats-based representation(s) of one or more documents in the collection 24 is output. As will be appreciated, other representations of the collection of documents 24 are also contemplated.

The method ends at S224.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart method shown in FIG. 2, can be used to implement the method described herein.

The method illustrated in FIG. 2 may be implemented in a computer program product or products that may be executed on a computer. The computer program product may be a non-transitory computer-readable recoding medium on which a control program is recorded, such as a disk, hard drive, or the like configured for performing the method. Common forms of computer-readable media include, for example, floppy discs, flexible discs, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 18, (for example, an internal hard drive of RAM), or may be separate (for example, an external hard drive operatively connected with the computer 18), or may be separate and accessed via a digital data network such as a local area network (LAN) or the Internet (for example, as a redundant array of inexpensive of independent disks (RAID) or other network server storage that is indirectly accessed by the computer 18, via a digital network).

Alternatively, the method may be implemented in transitory media as a transmittable carrier wave in which the control program is embodied as a data signal using transmission media, such as acoustic or light waves, such as those generated during radio wave and infrared communications, and the like.

Various aspects of the method will now be described in greater detail.

Pre-Processing the Collection of Documents, Forming an Alphabet (S104)

The system receives as input a collection of text documents, such as at least two, or at least ten, or at least 100 text documents. Pre-processing of the input documents may include OCR recognition, if the documents are in an unstructured format. The text content of each of the documents is then parsed to identify a sequence of tokens. Exemplary parsing techniques are disclosed, for example, in Salah Aït-Mokhtar, Jean-Pierre Chanod, and Claude Roux, "Robustness beyond shallowness: incremental dependency parsing," in special issue of the NLE Journal (2002); U.S. Pat. No. 7,058,567; and Caroline Brun and Caroline Hagège, "Normalization and paraphrasing using symbolic methods" ACL: Second International workshop on Paraphrasing, Paraphrase Acquisition and Applications, Sapporo, Japan, Jul. 7-12, 2003, the disclosures of which are incorporated herein by reference.

In one embodiment, preprocessing may be based on the Xerox Incremental Parser (XIP), which may have been enriched with additional processing rules to facilitate normalization of the words of the documents. Other natural language processing or parsing algorithms can alternatively be used.

In one embodiment, pre-processing handles tokenization, and optionally morphological analysis and part of speech (POS) tagging. Specifically, a preprocessing breaks the collection of documents into a sequence of tokens, each generally corresponding to a word. Parts of speech may be identified from the words, such as noun, verb, etc. Some tokens may be assigned more than one part of speech, and may later be disambiguated, based on contextual information. The tokens may be tagged with the identified parts of speech.

While particular reference is made herein to words, it is to be appreciated that other tokens, in addition to words (which are able to be assigned a part of speech), may be considered as part of the sequence S. In other embodiments, the documents may be stripped of punctuation (or punctuation simply ignored).

Defining a Document Sequence for the Collection of Documents (S206)

A sequence s may be considered as a concatenation of atomic symbols s[1] . . . s[n], in which s[i] is an element (word) in the alphabet set, $\Sigma$. A set of sequences, where each sequence represents the words in a single textual document may be used to define the document sequence for the collection of documents 24. Alternatively, one aggregated sequence S is used which concatenates all individual document sequences intercalating unique separators. Here, the separators can be considered as context for the preceding and following words.

Identifying the Set of all Repeats (S208)

The following notation is used for ease of description. A subsequence r is said to occur in a sequence s (e.g., in document collection sequence S) at a position k if: $r[i]=s[k+i]$ for $i=1 \ldots |r|$. The set of occurrences of r in s is denoted by: $pos_s(r)$. If $pos_s(r) \geq 2$, then r is called a repeat of s. The set of all repeats of s is denoted by: $\mathcal{R}(s)$.

Given a collection 24 of documents $d_1, d_2, \ldots d_N$, all repeats r may be computed in the sequence $S=d_1|_1 d_2|_2 \ldots d_N$. This yields the set of all repeats $\{r_1, \ldots rK\}$.

Repeats may be calculated in linear time using a data structure from a suffix array family, such as a suffix tree or suffix array (see, for example, Simon J. Puglisi, et al., *Fast optimal algorithms for computing all the repeats in a string*, In Jan Holub and Jan Zdarek, editors, Prague Stringology Conference, pages 161-169, 2008, (hereinafter "Puglisi"); and Dan Gusfield, *Algorithms on Strings, Trees, and Sequences: Computer Science and Computational Biology*, Cambridge University Press, January 1997, hereinafter "Gusfield"). In one embodiment, repeats are calculated with a linear implementation using the suffix array.

Repeats can be of any length and in the exemplary embodiment, the identified set of repeats for the collection of documents as a whole includes repeats of different lengths n. For example, the set of repeats may include repeat subsequences of at least two, or at least three different lengths selected from 1, 2, 3, 4, and 5 (or more) words in length.

The set of identified repeats may be stored in memory 14.

Identifying Contexts of the Repeat Subsequences (S210)

At S210, the context for each occurrence of a repeat subsequence in the collection of documents is identified. The context may include the repeat occurrence's left context and/or its right context.

The left context of a repeat r in s for a subset of occurrences p is defined as: $lc_s(r,p)=\{s[i-1]: i \in p\}$. The left context for a given repeat occurrence, in the exemplary embodiment is thus a symbol which immediately precedes the repeat subsequence in the document collection sequence.

The right context of a repeat r in s for a subset of occurrences p is defined as: $rc_s(r,p)=\{s[i+|r|]:i \in p\}$. The right context for a given repeat occurrence, in the exemplary embodiment is thus a symbol which immediately follows the repeat subsequence in the document collection sequence.

A left (or right) context can be defined as being unique or diverse. For one occurrence o of a given repeat r, the repeat r is defined as being left-context unique $lcu_s(r,o)$ if it is the only occurrence of r in the identified document sequence with this left-context:

$$lcu_s(r,o)=(lc_s(r,\{o\}) \not\subset lc_s(r,pos_s(r)\backslash\{o\})).$$

For a given r, a subset $p \subseteq pos_s(r)$ is said to be left-context diverse: $lcd_s(r,p)$ if the set of characters $|lc_s(r,p)| \geq 2$. i.e., there are at least two occurrences of the repeat sequence in the document sequence which have different left contexts.

Similarly, for one occurrence o of r, the repeat r is defined as being right-context unique if it is the only occurrence of the repeat with this right-context:

$$rcu_s(r,o)=(rc_s(r,\{o\}) \not\subset rc_s(r,pos_s(r)\backslash\{o\})).$$

For a given r, a subset $p \subseteq pos_s(r)$ is said to be right-context diverse $rcd_s(r,p)$ if $|rc_s(r,p)| \geq 2$, i.e., there are at least two occurrences of the repeat sequence in the document sequence which have different right contexts.

There may be subsets of repeats that are both right- and left-context unique. There may be subsets of repeats both right- and left-context diverse. Additionally, a subset of occurrences can be left-context diverse and not have any occurrence that is left-context unique. Similarly, the subset can be right-context diverse and not have any occurrence that is right-context unique.

As an example, consider that the document collection includes the following sequence:

I live in New York City . . . | . . . Often, living in New York is expensive . . . | . . .

(where the dots indicate other symbols and | indicates the end of a document, each of which is considered as a unique context) which is reduced to a normalized form at S204 to:

i live in new york city . . . | . . . often live in new york be expensive . . . |

For identifying context-uniqueness the system takes all occurrences of a repeat, and looks at their left(right) contexts. Those occurrences of the repeat that have a left-context which is unique (i.e. which does not appear as left-context of the other occurrences of the repeat) are labeled as context-unique.

The system at S208 identifies the following repeats:
live, in, new, york, live in, in new, new york, live in new, in new york, live in new york.

The following subsets of repeats (assuming no other occurrences in the document collection) are labeled as left context diverse (the contexts are noted in parentheses): (i, often)live, (i, often)live in, (i, often)live in new, (i,often)live in new york, since there are at least two occurrences of the repeat sequence in the document sequence which have different left contexts.

The following subsets of repeats are left context unique: (i)live, (often)live, (i)live in, (often)live in, (i)live in new, (often)live in new, (i)live in new york, (often)live in new york since there is only a single occurrence of the repeat in each respective left context.

Similarly, right context unique and/or diverse subsets of repeats can be identified:

Right context diverse: york(city, be), new york(city, be), in new york(city, be), live in new york(city, be), since there are at least two occurrences of the repeat sequence in the document sequence which have different right contexts.

Right context unique: york(city, be), new york(city, be), in new york(city, be), live in new york(city, be), since each different context has only one occurrence.

Assigning Maximality Classes to Repeats (S212)

In one embodiment, the occurrence of repeats r is defined in terms of maximal repeats. Maximal repeats (left- and right-context diverse repeats) are compact representations of all repeats. In contrast to normal repeats, the number of maximal repeats inside a sequence is linear in n and it is also simple to recover all repeats from the set of maximal repeats.

A maximal repeat is a repeat such that if it was extended to its left or right, it would lose some of its occurrences. The set of maximal repeats ($\mathcal{MR}$) is formally defined as the set of repeats that are both left- and right-context diverse. This can be represented formally as:

$$\mathcal{MR}(s)=\{r \in \mathcal{R}(s): lcd_s(r,pos_s(r)) \wedge rcd_s(r,pos_s(r))\} \quad (1)$$

Here, the symbol ∧ indicates that both $lcd_s(r, pos_s(r))$ and $rcd_s(r, pos_s(r))$ must be true. The property of maximality is strongly related to the context of a repeat. If the symbol to the left or right of any occurrence of r is always the same, then r is not a maximal repeat because it could be extended to its right or left without losing any occurrences.

From this set, other repeats can readily be identified from the contexts.

In another embodiment, the occurrence of repeats r is defined in terms of largest-maximal repeats (left- and right-context unique repeats). The set of largest-maximal repeats ($\mathcal{LMR}$) is the set of repeats which have at least one occurrence that is both right- and left-context unique:

$$\mathcal{LMR}(s)=\{r \in \mathcal{R}(s): \exists o \in pos_s(r):lcu_s(r,o) \wedge rcu_s(r,o)\} \quad (2)$$

In the above example, live in new york is both left and right context diverse and left and right context unique, so it is added to the class of maximal repeats and the class of largest maximal repeats $\mathcal{LMR}$ As another example, suppose the following documents exist (one per line):
I live in Grenoble
I live in New York
New York
I live in New Hampshire It is assumed that no repeat spans over a document border. That is, after each document there are separator symbols that are unique.

The set of maximal repeats is then:

| | |
|---|---|
| I live in New | [two different left contexts: unique separators, two different right contexts: "York" and "Hampshire"] |
| I live in | [two different left contexts: unique separators, two different right contexts: "Grenoble" and "New"] |
| New York | [two different left contexts: in, and a unique separator, two different right contexts: unique separator symbols] |
| New | [two different left contexts: in, and a unique separator, two different right contexts: "York" and "Hampshire"] |

Of these, the only one which is not also a largest-maximal repeat is New, because its three occurrences can be captured by the repeats "New York" and "New Hampshire". Formally, it is not context-unique: the first occurrence is surrounded by (in, York), the second by (_separator_,York) and the third by (in, Hampshire); none of them is unique.

Largest-maximal repeats cover the whole sequence, except for unique symbols. Largest-maximal repeats also cover the whole sequence in a less redundant way than maximal repeats.

Algorithms exist for computing maximal repeats in linear time using a data structure from the suffix family, like a suffix tree or suffix array. See, for example Gusfield and Puglisi.

Table 1 gives an overview of the known bounds for three classes of repeats: normal repeats $\mathcal{R}$, maximal repeats $\mathcal{MR}$, and largest-maximal repeats $\mathcal{LMR}$, where $\eta_x(n)$ denotes $\max_{s:|s|=n}\{|X(s)|\}$ where X stands for one of $\mathcal{R}$, $\mathcal{MR}$, $\mathcal{LMR}$, or $\mathcal{SMR}$ and $\omega_x(n)=\max_{s:|s|=n}\{\Sigma r \in x(s)|pos_s(r)|\}$

TABLE 1

| class | $\eta_x(n)$ | $\omega_x(n)$ |
|---|---|---|
| $\mathcal{R}$ | $\Theta(n^2)$ | $\Theta(n^2)$ |
| $\mathcal{MR}$ | $\Theta(n)$ | $\Theta(n^2)$ |
| $\mathcal{LMR}$ | $\Theta(n)$ | $\Omega\left(n^{\frac{3}{2}}\right)$ |

In one embodiment, a set of maximal repeats $\mathcal{MR}$ (s) is defined within the set of all repeats. In another embodiment, a set of largest maximal repeats $\mathcal{LMR}$ (s) is defined within the set of all repeats. Their number may be strictly less than those of maximal repeats, therefore using $\mathcal{LMR}$ results in a smaller vector spaced representation than when using $\mathcal{MR}$ as a feature, although a potentially less informative representation. In yet another embodiment, a set of largest maximal repeats $\mathcal{LMR}$ (s) is defined within the set of all repeats, but only those occurrences which are right and left-context unique are counted. This further limits redundancy of the $\mathcal{LMR}$.

As will be appreciated, some of the repeats may be included in the representation irrespective of whether they are in a maximality class. For example, repeats of a threshold number of symbols could be automatically included, such as repeats of at least four or more symbols (words) in the subsequence, may provide useful information.

Generating a Vector Spaced Representation (S214)

Each document $d_i$ in the collection of documents $d_1, d_2 \ldots d_N$ may be mapped into a vector $r_{di}$ of size K, where, $r_{di}(j)$ contains the number of times repeat $r_j$ appears in document $d_i$. The exemplary representation 30 uses at least one of the maximality classes of repeat, e.g., $\mathcal{MR}$ or $\mathcal{LMR}$, as a basic feature in the generated vector space representation.

In one embodiment, the document representation includes a value for each of the repeats that are in the selected one or more of the maximality classes. The repeat is identified as present in the document, even if the contexts are different from those employed in identifying the repeat as maximal repeat or largest maximal repeat.

In another embodiment, when is $\mathcal{LMR}$ used, for a document only those repeats which fall in the class of largest maximal repeats that are left and right context unique are included in the document representation.

In some embodiments, the vectorial representation may be normalized, for example so that all values sum to 1, or so that the sum of their square roots is 1.

For example, in the case of the exemplary text above, for an $\mathcal{LMR}$-based representation, the first document (before the separator) may be given a representation of the form: (1,0,0, 0, . . . ) since there is one occurrence of a repeat which is in the largest maximal class live in new York (given the index 1), assuming for this example, that there are no other repeats in the document which include a subsequence assigned to a largest maximal class. As will be appreciated, much longer texts may have a much larger number of non-zero values in the representation. The representation can then be normalized.

Classifier Learning and Classification (S216, S218)

Classifier learning can be performed with any suitable non-linear or linear learning method. Such classifier systems are well known and can be based, for example, on a variety of training algorithms, such as, for example: linear discriminants such as linear least squares, Fisher linear discriminant or Support Vector Machines (SVM); decision trees; K-nearest neighbors (KNN); neural networks, including multi-layer perceptrons (MLP) and radial basis function (RBF) networks; and probabilistic generative models based e.g., on mixtures (typically Gaussian mixtures). The exemplary classifier component 70 may include a multiclass classifier or a set of binary classifiers, each trained on a respective one of the categories (labels) in the set.

In one exemplary embodiment, Support Vector Machines (SVMs) can be used for multi-class training data. Exemplary SVM algorithms and the mapping convergence methods are discussed in Chidlovskii, et al., U.S. Pub. No. 2011/0103682, incorporated herein by reference.

Clustering/Generating Most Probable Words in Collection of Documents (S220)

The exemplary repeat-based representations can be as an input in a probabilistic topic (clustering) model. In one embodiment, repeats are used as input features in a clustering component, such as a Latent Dirichlet Allocation (LDA) model. In another embodiment, only right and left-context unique occurrences of repeats are used in the clustering model. The output of such a model may be a set of the most probable repeats for each of a set of topics. See, for example, Blei, et al., and U.S. application Ser. No. 13/437,079, filed Apr. 4, 2012, entitled FULL AND SEMI-BATCH CLUSTERING, by Matthias Galle and Jean-Michel Renders, the disclosures of which are incorporated herein by reference, for details on exemplary clustering algorithms which can be used with text documents.

The similarity between two repeats-based feature vectors 30 representing two documents can then be defined as their negative L1 or L2 distance. In one embodiment, a simple dot product or cosine similarity between vectors can be used as the similarity measure between two documents.

As will be appreciated the uses of the exemplary repeats-based representation 30 are not limited to those mentioned herein.

The bag-of-repeats method is linked to linguistic theory. It has been empirically shown that replacing iteratively repeated pairs of letters provides a completely unsupervised tool for detecting word boundaries (see, for example, J. Gerald Wolff, *Learning syntax and meanings through optimization and distributional analysis*, Categories and processes in language acquisition, January 1998). Grammatical inference algorithms, like Sequitur, ADIOS, ABL, and others also identify constituents as repeated substrings (see, for example, Craig G. Nevill-Manning and Ian H Witten, *Compression and explanation using hierarchical grammars*, The Computer Journal, 40(2,3):103-116, February 1997; Zach Solan, et. al, *Unsupervised learning of natural languages*, Proceedings of the National Academy of Sciences, Jan 2005; Menno van Zaanen, *ABL: Alignment-based learning*, In International Conference on Computer Linguistics, 2000; Alexander Clark, *Learning deterministic context free grammars: The*

*omphalos competition*, Machine Learning, pages 930-110, Jan 2007. Focusing on repeated words is also reflected in heuristics of state-of-the-art systems.

The bio-informatics field has also employed the concept of representing documents by the occurrences of repeats. High-throughput sequencing of nucleotides and amino acids has allowed for alignment free sequence comparison methods. For example, one method maps the maximal repeats inside one sequence to a vector-space model, and compares those vectorial representations (see, for example, Alberto Apostolico et al., *Efficient tools for comparative substring analysis*, Journal of Biotechnology, 149(3):120-6, September 2010). Classes of repeats are described in Gusfield and some have recently been applied to the automatic detection of CRISPRs, a genomic structure found in archaea and bacteria that are expected to have a role in their adaptive immunity (see, for example, Christine Rousseau, Mathieu Gonnet, Marc Le Romancer, and Jacques Nicolas, *CRISPI: a CRISPR interactive database*, Bioinformatics, 25(24), 2009).

However, the work performed in the bio-informatics field differs from the bag-of-repeats method as applied to textual documents in both application and method of calculation. Unlike bioinformatic applications, where calculating the occurrence of repeats is performed intra-document or intra-sequence, the bag-of-repeats method described herein is applied to textual documents and calculates occurrences of repeats inter-document, taking into consideration the whole collection. For genetic sequences, there is a total lack of definition in the meaning of a word, and therefore heuristics such as maximal repeats are used where computing the bag-of-repeats is performed intra-document. In contrast, in the case of natural languages, very few subsequences (besides single words) will be represented inside a document, and computing them over the whole collection distills colocation and meaningful expressions.

Without intending to limit the scope of the exemplary embodiment, the following examples demonstrate the applicability of the method.

EXAMPLES

Effectiveness

Using repeats for document representations instead of unigram or n-grams is shown to have an impact on information retrieval tasks. Two types of data sets were used to demonstrate the effectiveness of the bag-of-repeats approach. The first type of data set included well-understood classical text collections. The performance of conventional classifiers in correctly classifying these texts is generally close to 90%. These datasets included a 20 newsgroup dataset including 18,774 posts and a TDT5 news article dataset including 6,496 news articles labeled with 126 stories. A third dataset consisted of a collection of scanned and OCRed forms, consisting of 4,615 forms belonging to 34 different categories. These datasets were first used in a learning step to train the classifier.

In all three cases (newsgroup articles, news story collection, and scanned forms) a multi-label classifier was learned through logistic regression (l2-nomalized) (using Liblinear software, http://www.csie.ntu.edu/cjlin/liblinear). A mean accuracy of labeling on 5-fold cross validation was calculated for different values of c, the regularization parameter used in logistic regression.

Figure 3:
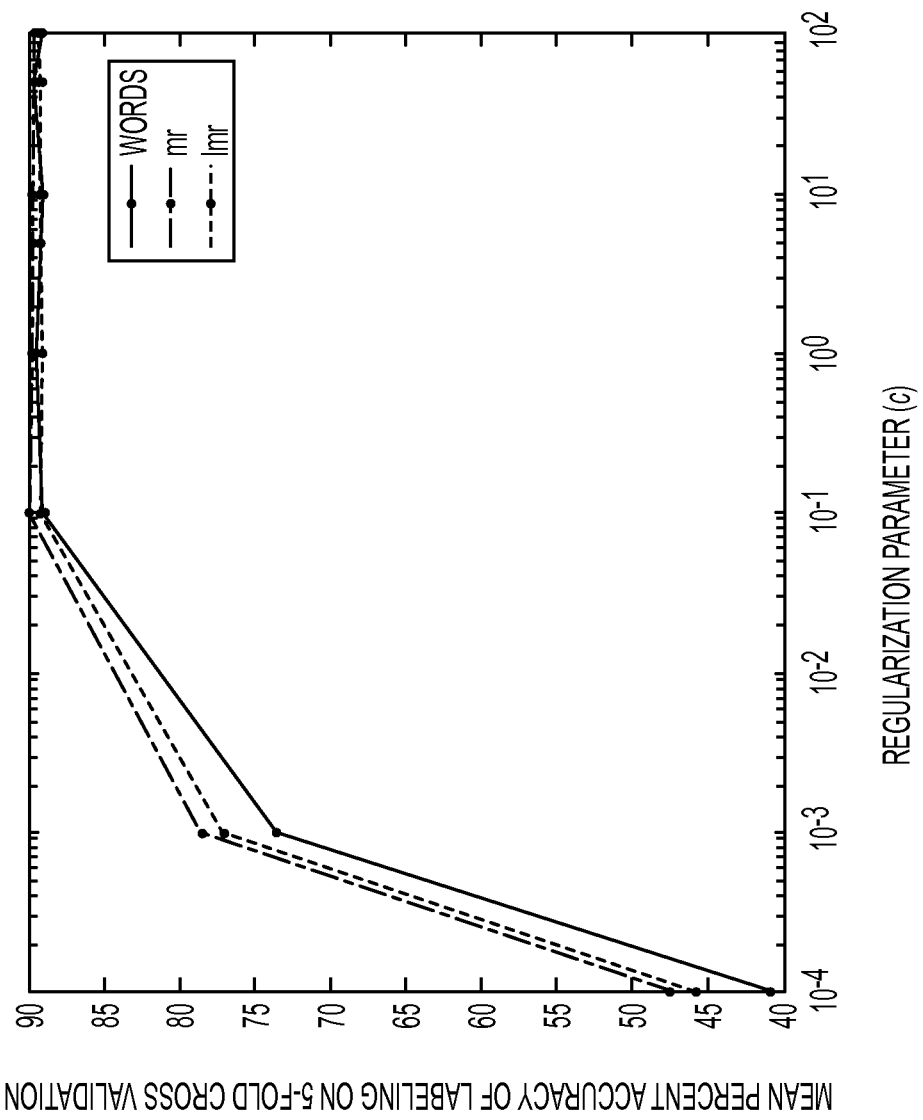
FIG. 3 is a graph of mean accuracy of classifying a dataset consisting of classical texts on 5-fold cross validation versus regularization parameter, c, using words, maximal repeats, and largest maximal repeats as a feature in the document representation.

With reference to FIG. 3, the dataset consisting of well-known classical texts has been classified using words, maximal repeats, and largest maximal repeats as features in the vector space model representation of documents. The mean accuracy of correctly classifying on 5-fold cross validation (y-axis) is plotted against the regularization parameter, c of the classifier. The mean accuracy is slightly better with the exemplary features (maximal repeats mr, and largest maximal repeats, lmr) than with single words for these relatively easy to classify classical texts.

Figure 4:
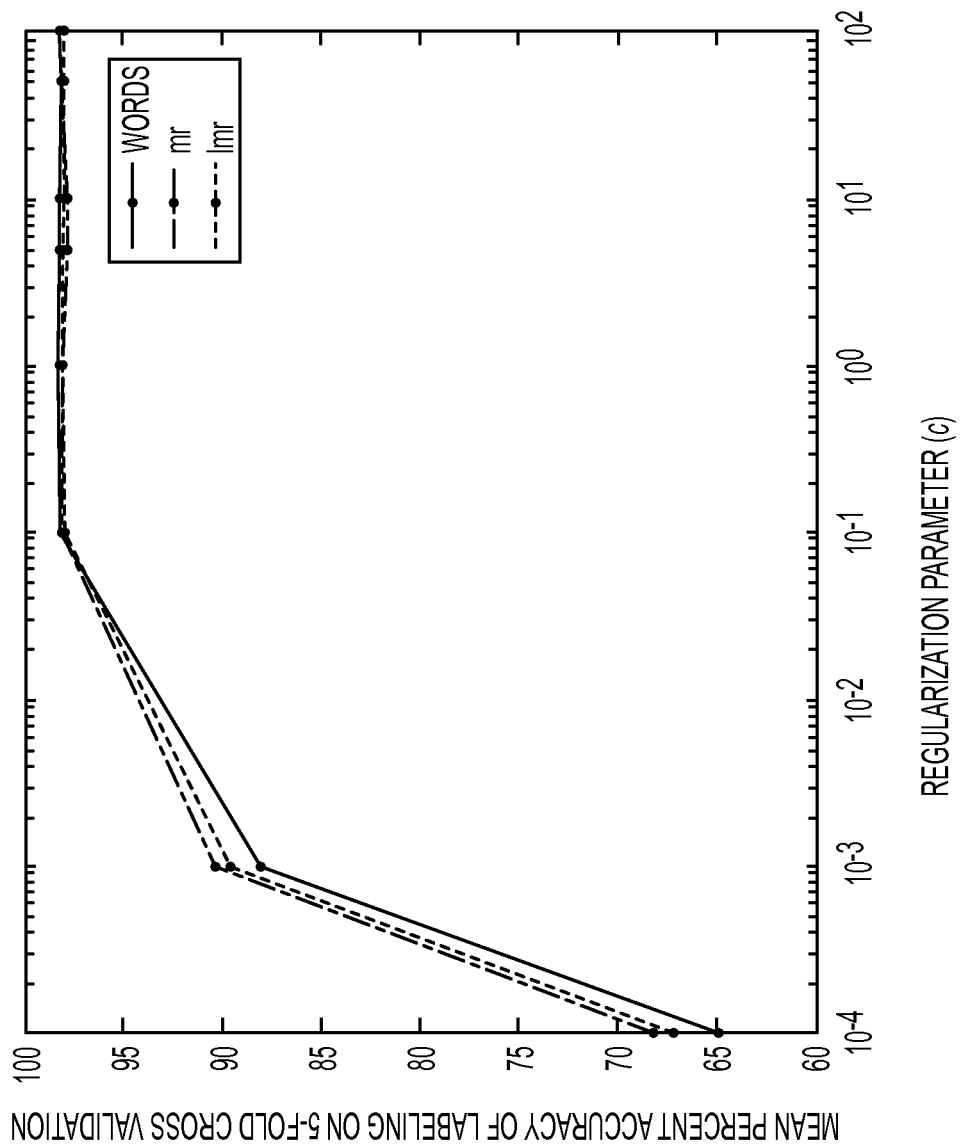
FIG. 4 is a graph of mean accuracy of classifying a dataset consisting of classical texts on 5-fold cross validation versus regularization parameter, c, using words, maximal repeats, and largest maximal repeats as a feature in document representation.

With reference to FIG. 4, the dataset containing TDT5 news articles has been classified using words, maximal repeats, and largest maximal repeats as features in the vector space model representation of documents. The mean accuracy of correctly classifying on 5=fold cross validation (y-axis) is plotted against regularization parameter, c. The mean accuracy once again shows only a small improvement using the present representations.

Figure 5:
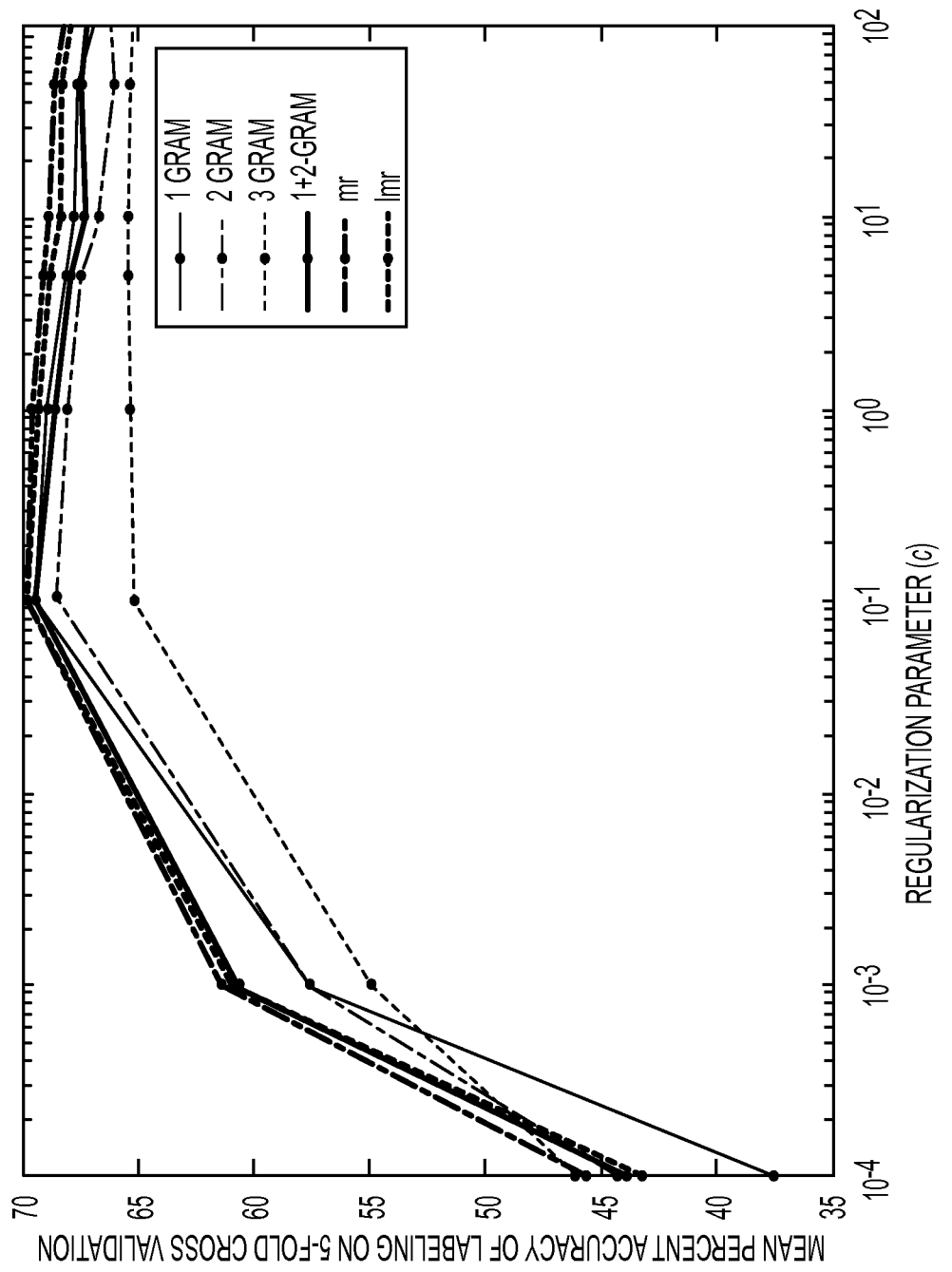
FIG. 5 is a graph of mean accuracy of a dataset consisting of classifying scanned forms on 5-fold cross validation versus regularization parameter, c, using words, maximal repeats, and largest maximal repeats as a feature in document representation.

With reference to FIG. 5, the dataset containing scanned and OCRed forms has been classified using words, maximal repeats, and largest maximal repeats as features in the vector space model representation of documents. The mean accuracy of correctly classifying on 5-fold cross validation (y-axis) is plotted against the regularization parameter, c. In this case, when using the more difficult case of scanned forms, the performance increase when using maximal repeats or largest-maximal repeats is clearly demonstrated. Better performance is obtained using maximal and largest maximal repeats than when using 2-gram, 3-grams, or even unigrams+bigrams in the vector space model, with the exception of when $c=10^{-4}$. While there were 2.87 times more largest-maximal repeats than words (4.02 times for the case of maximal repeats), there were far less than bigrams (a ratio of 0.45 and 0.63 respectively).

Expressiveness

Because repeats tend to be larger than simple words, they are also likely to be more expressive. Probabilistic Topic Models are one of the most popular unsupervised methods to explore a document collection. One of the main drawbacks of these methods is their interpretability (see, for example, David Blei, Probabilistic Topic Models, Communications of the ACM, 55(4): 77-84, November 2012). The standard way is to show the k most probable words for each topic, but this unigram representation may be redundant or not informative enough. For example, using n-grams as input features has been explored by expanding the basic Latent Dirichlet Allocation (LDA) model (see, for example, Hanna M. Wallach, *Topic Modeling: Beyond Bag-of-Words*, in ICML, number 1, pages 977-984, ACM, 2000, for a combination of hierarchical bigram modeling with LDA; Xuerui Wang, et al., Topical N-Grams: Phrase and Topic Discovery, with an Application to Information Retrieval, in Seventh IEEE International Conference on Data Mining (ICDM 2007), pages 697-702, October 2007, for an extension of LDA by modeling the generation of documents as a process of either generating a unigram of an n-gram).

Instead of using word counts as input for the LDA model, repeats counts may be used an input for the LDA model. The basic LDA models tend to favor very frequent features over less frequent ones. Because shorter repeats tend to appear more frequently than longer ones, this would favor repeated single words. To balance this, and to reduce any bias due to over-counting the same words, tests were performed to count only right and left-context unique occurrences with repeats. The results of these tests are shown in FIG. 6.

With reference to FIG. 6, the most probable repeats for some topics are shown. These were obtained using the AP dataset of news articles used in David M. Blei and Michael I. Jordan, *Modeling annotated data*, in Proc. 26th annual international ACM SIGIR conference on Research and development in information retrieval, SIGIR '03, pages 127-1343, New York, N.Y., USA, 2003, ACM. The Table in FIG. 6 shows the 20 most probable terms for a selection of topics, learned on a standard LDA model inferred with 40 topics, using Gibbs sampling of 1000 iterations. As can be seen, the topics include one and two-word terms and the most probable terms, for the most part, are different.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for representing a textual document based on the occurrence of repeats, comprising:
    a sequence generator which defines a sequence representing words forming a collection of documents;
    a repeat calculator which identifies a set of repeats within the sequence, the set of repeats comprising subsequences of the sequence which each have more than one occurrence in the sequence;
    a context calculator which identifies at least one of a left context and a right context for each occurrence of a repeat in the set of repeats, the left context of an occurrence of the repeat being a word which immediately precedes the occurrence of the repeat in the document collection sequence, the right context of an occurrence of the repeat being a word which immediately follows the occurrence of the repeat in the document collection sequence, the context calculator identifying repeats in the set of repeats which are at least one of left context diverse, riqht context diverse, left context unique, and right context unique based on the identified at least one of the left context and the right context for each occurrence of the repeat,
        a repeat being identified as left context diverse if it appears in at least two different left contexts,
        a repeat being identified as riqht context diverse if it appears in at least two different right contexts,
        an occurrence of a repeat being identified as left context unique if it is the sole occurrence of the repeat in that left context, and
        an occurrence of a repeat being identified as right context unique if it is the sole occurrence of the repeat in that right context;
    a representation generator which generates a representation for at least one document in the collection of documents based on occurrence, in the document, of repeats from the set of repeats, the representation accounting for the context of at least some of the repeats in the set of repeats; and
    a processor which implements the sequence generator, repeat calculator, and representation generator.

2. The system according to claim 1, wherein the representation of the document is based on occurrence, in the document, of repeats from the set of repeats that have been identified as being at least one of left context diverse, right context diverse, left context unique, and right context unique.

3. The system according to claim 1, wherein the representation of the document is based on occurrence, in the document, of repeats from the set of repeats that have been identified as being at least one of:
    both left and right context diverse, and
    both left and right context unique.

4. The method of claim 3, wherein the representation of the document is based on occurrence, in the document, of repeats from the set of repeats that have been identified as being both left and right context unique.

5. The system of claim 1, wherein the context calculator, for each identified repeat, identifies the left and right contexts of occurrences of the repeats in the documents.

6. The system of claim 1, wherein the sequence generator defines a sequence representing words forming the collection of documents, where each word is represented by a symbol that uniquely identifies a normalized form of the word.

7. The system according to claim 1, further comprising a classifier component which predicts the classification of the at least one document based on the document representation.

8. The system according to claim 7, wherein the classifier component predicts the classification of a document based a document representation indexed by largest maximal repeats, the largest maximal repeats comprising repeats from the set of repeats that are both left and right context unique.

9. The system according to claim 7, wherein the classifier component predicts the classification of a document based a document representation indexed by maximal repeats, the maximal repeats comprising repeats from the set of repeats that are both left and right context diverse.

10. The system according to claim 1, further comprising a clustering component which clusters documents in the collection of documents based on the document representation.

11. The system of claim 1 further comprising a comparison component which compares representations of at least two documents in the collection and outputs information based on the comparison.

12. The system according to claim 1, further including a parser component for pre-processing the collection of documents to identify words.

13. The system according to claim 1, wherein the sequence representing words in the collection of documents is a concatenation of atomic symbols, wherein each symbol represents a word or a normalized form thereof.

14. The system of claim 1, wherein the repeats are identified regardless of sequence length.

15. A method for representing a textual document based on the occurrence of repeats, comprising:
    receiving a collection of text documents;
    defining a sequence representing words forming the collection of documents;
    identifying a set of repeats within the sequence, the set of repeats comprising subsequences of the sequence which each have more than one occurrence in the sequence;
    for each repeat in the set of repeats, identifying at least one of a left context and a right context for each occurrence of the repeat, the left context of the occurrence of the repeat being a word which immediately precedes the occurrence of the repeat in the document collection sequence, the right context of the occurrence of the repeat being a word which immediately follows the occurrence of the repeat in the document collection sequence;
    generating a representation for at least one document in the collection of documents based on occurrence, in the document, of repeats from the set of repeats and their identified at least one of left and right contexts; and
    wherein at least one of the defining a sequence, identifying a set of repeats, and generating a representation is performed by a computer processor.

16. The method according to claim 15, further including assigning a maximality class to at least one repeat within the identified set of all repeats.

17. The method according to claim 16, wherein the assigned maximality class is at least one of a maximal repeat and a largest maximal repeat.

18. The method according to claim 15, wherein the representation is indexed by the at least one of maximal repeats and largest maximal repeats.

19. The method according to claim 15, further comprising at least one of:
- classifying the document based on the generated representation and outputting information based on the classification;
- clustering documents in the collection based on their representations and outputting information on the clusters; and
- computing a comparison measure between at least two documents in the collection based on their representations and outputting information based on the computed comparison measure.

20. A computer program product comprising a non-transitory storage medium storing instructions, which when executed by a processor, perform the method according to claim 15.

21. The method according to claim 15, further comprising identifying maximal repeats in the set of repeats, each maximal repeat being both left-context diverse and right-context diverse, a repeat being identified as left context diverse if it appears in at least two different left contexts, a repeat being identified as right context diverse if it appears in at least two different right contexts.

22. The method according to claim 15, further comprising identifying largest maximal repeats, each largest maximal repeat being an occurrence of one of the repeats in the set of repeats which is both left-context unique and right-context unique, an occurrence of a repeat being identified as left context unique if it is the sole occurrence of the repeat in that left context, and an occurrence of a repeat being identified as right context unique if it is the sole occurrence of the repeat in that right context.

23. A method for representing a textual document based on the occurrence of repeats, comprising:
- receiving a collection of documents;
- defining a sequence representing words forming the collection of documents;
- identifying a set of repeats within the sequence, the set of repeats comprising all subsequences of the sequence which each occur more than once, the repeats being identified regardless of length;
- from the set of repeats, identifying a subset of the repeats that are at least one of: both left and right context diverse and both left and right context unique;
- generating a vectorial representation for at least one document in the collection of documents based on occurrence, in the document, of repeats identified as being in the subset of repeats; and
- wherein at least one of the defining a sequence, identifying a set of repeats, identifying a subset of the repeats, and generating a representation is performed by a computer processor.

24. The method of claim 23, wherein a repeat is identified as left and right context diverse if it occurs in at least two different left contexts and at least two different right contexts, and an occurrence of a repeat is identified as left and right context unique if it is the sole occurrence of the repeat in that left context and that right context.

* * * * *